United States Patent [19]

Solie et al.

[11] Patent Number: 4,683,826

[45] Date of Patent: Aug. 4, 1987

[54] SUBSURFACE APPLICATION OF CHEMICALS

[75] Inventors: John B. Solie, Stillwater, Okla.; Howard D. Wittmuss, Lincoln, Nebr.; Orvin C. Burnside, St. Paul, Minn.

[73] Assignee: The Board of Regents of the University of Nebraska, Lincoln, Nebr.

[21] Appl. No.: 723,914

[22] Filed: Apr. 15, 1985

Related U.S. Application Data

[63] Continuation-in-part of Ser. No. 356,447, Mar. 9, 1982.

[51] Int. Cl.4 ............................................. A01C 23/02
[52] U.S. Cl. ........................................ 111/7; 47/1.7
[58] Field of Search ............... 47/1.7; 111/7, 6, 73, 111/80, 86

[56] References Cited

U.S. PATENT DOCUMENTS

| | | | |
|---|---|---|---|
| 1,093,786 | 9/1913 | Korthauer | 111/7 |
| 3,294,324 | 12/1966 | Skaptason | 47/1.7 |
| 3,581,685 | 6/1971 | Taylor | 111/7 |

Primary Examiner—Robert A. Hafer
Assistant Examiner—Bradley M. Lewis
Attorney, Agent, or Firm—Vincent L. Carney

[57] ABSTRACT

In the subsurface application of herbicides, a plurality of upwardly directed nozzles having one millimeter openings are pulled beneath the soil surface behind the trailing side of a sweep in parallel paths two to four centimeters apart while jets of herbicide are emitted so that moving soil passing over each jet receives ample herbicide properly spaced to control germinating weeds. The pressure of application and speed of movement forms treated bands having widths before diffusion of five millimeters of soil and liquid uniformly mixed to a depth of approximately eight centimeters over the treated area. The sweep operates at a depth up to eight centimeters and pesticide incorporation depends on such variables as soil density, soil moisture, spacing of nozzles and injection pressure. A uniform distribution of chemicals in bands near or completely to the surface of the soil is made possible with a one-pass operation, while the soil and plant residue on the surface remain substantially undisturbed.

4 Claims, 4 Drawing Figures

SUBSURFACE APPLICATION OF CHEMICALS

RELATED CASES

This application is a continuation-in-part of U.S. application Ser. No. 356,447, filed on Mar. 9, 1982 by Witmuss et al. and assigned to the same assignee as this application.

BACKGROUND OF THE INVENTION

The present invention relates to subsurface pressure injection into soil of chemicals such as herbicides, insecticides, nematocides, fertilizers, fungicides and other materials requiring soil incorporation.

In one class of subsurface application of chemicals, dispensers are moved underground while chemicals are spread by the dispensers.

In one type of prior art applicator of this class, tractor-drawn injector applicators penetrate the soil and inject chemicals at several spaced locations at one depth behind the tractor. Another type of prior art applicator of this class includes a dispenser attached to an implement such as a spade or a plow to introduce chemicals into a trench formed by the implement as it is pulled through the ground behind a tractor. These two types of applicators have the disadvantages of: (1) not producing uniform distribution of chemicals throughout the soil; (2) breaking a substantial portion of the soil surface; and (3) being only locally effective.

A third type of prior art technique of this class is to first apply the chemicals to the surface of the soil and subsequently mix the chemicals with the soil by tilling the soil in some fashion. This technique has the disadvantages of: (1) causing variable amounts of the chemical to be lost or wasted in the uppermost, relatively dry layers; (2) mixing the plant residue into the uppermost layers of soil and loosening the soil, thus causing the soil surface to become susceptible to erosion due to water runoff or wind; and (3) requiring the application of chemicals and their mixing to be done in two separate operations in most instances.

In still another type of prior art technique of this class, a horizontally disposed implement, or sweep, to which a plurality of horizontally oriented spray nozzles are secured is connected directly to a tractor or to a tractor-drawn frame and drawn beneath the surface of the soil and, upon pumping chemicals such as herbicides or fertilizers through the nozzles, a layer of chemicals is introduced into the soil. This technique has the disadvantage of providing insufficient distribution of the chemicals into the soil because the chemicals are applied in a discrete layer rather than being uniformly mixed into the upper soil zone where most weed seeds germinate.

SUMMARY OF THE INVENTION

Accordingly, it is an object of the invention to provide a novel apparatus for applying chemicals to soil.

It is a further object of the invention to provide a novel method for applying chemicals to the soil.

It is a still further object of the invention to provide a method and apparatus for applying chemicals via the subsurface of soil with a minimum disturbance of the topsoil and surface residue while incorporating the chemicals uniformly to a predetermined depth in the soil with a single pass.

It is a still further object of the invention to provide a superior method for applying chemicals to the germination and root zone of weeds.

In accordance with the above and further objects of the invention, a subsurface applicator includes a soil-moving implement and a fluid discharge boom ahead of the mulch treader. The fluid discharge boom directs a pressurized flow of herbicides or other chemicals up into the soil such that the chemicals are uniformly distributed in the soil in numerous adjacent bands as the soil passes over the implement.

The implement is drawn underneath the surface of the ground, thus breaking up compacted soil and destroying established weeds while leaving the surface soil and residue substantially intact. In the preferred practice of the invention, the fluid discharge means is a manifold mounted at the trailing edge of a sweep and extending substantially along its length. The manifold is provided with a plurality of apertures, or nozzles, through which a flow of herbicides or other chemicals is directed toward the surface of the soil. The nozzles follow parallel paths with respect to each other beneath the soil while spraying upwardly uniformly to distribute chemicals as the soil passes over the nozzles.

The chemicals are delivered under pressure through the nozzles and are directed toward the surface so that the flow of chemicals penetrates the soil as it passes over the trailing edge of the sweep. Uniform distribution is affected by the penetrating effect of the upwardly directed, pressurized flow of chemicals and by the movement of the soil as it passes over the sweep.

As the sweep passes through the ground, the soil passing over the sweep is in a broken, turbulent state. Uniform mixing is attained by injecting the chemical in pressurized solid-stream jets so that it penetrates the soil while the soil is in a turbulent and broken state. Depending on such variables as soil density, soil moisture, spacing of nozzles and injection pressure, the sweep can operate with its top edge at depths of up to eight centimeters from the soil surface and cause the chemicals to penetrate the soil to or near the surface. Application of chemicals in this manner provides equal or better distribution of the chemicals within the soil layer as compared with multiple-pass soil-mixing tillage.

More specifically, the sweep has a forwardly located apex and outwardly displaced trailing legs to move the soil upwardly over the sweep. The location of and spacing between parallel nozzles of the manifold, the speed of motion of the applicator with respect to the surface of the ground and volume of chemical carrier are each related to the uniformity of the distribution of the chemical. The distance between the parallel paths followed by any two adjacent nozzle openings is sufficiently short to place herbicide bands close enough together to effectively control weeds over the entire soil surface area.

The angle and width of the front of the sweep and the speed of movement of the applicator with respect to the soil surface in the direction it is being pulled is sufficiently great to force soil upwardly to achieve uniform movement in a layer of between one and five centimeters from the trailing edge of the rear of the sweep. The front of the sweeps move an amount of soil over the jets at a speed of movement so the jet forms a treated layer of soil having under some circumstances more than four gallons for each acre incorporated with at least one gallon for at least each 67 cubic yards of soil in an even layer between one and five centimeters thick.

The fluid volume must be sufficient so that, for a given porosity of soil and moisture content, enough fluid penetrates the soil from one nozzle to provide a volume of soil wet with the chemical to extend at least two inches high when the applicator is moving with a forward velocity of at least four miles per hour.

The proper rate of flow, pressure and speed may be determined experimentally for each field by incorporating a fluorescent tracer in the liquid and making trial runs at different pressures. The uniformity of incorporation for each trial run and pressure can then be determined by the conformity in the amount of fluorescent tracer in samples of soil taken from different locations in the area of each trial run.

This applicator and technique have the advantages of: (1) enabling herbicides to be applied in a single pass to a wide area; (2) limiting area which can be covered in a single pass only by the size of the sweep or by the number of sweeps employed at a given time; (3) permitting a subsurface applicator employing a manifold which can be attached to an existing sweep, thus enabling presently existing equipment to be used for the subsurface injection of herbicides and other chemicals; (4) permitting uniform distribution of the chemical; (5) not excesively disturbing the surface of the soil; and (6) retaining crop residues on the soil surface.

DESCRIPTION OF THE DRAWINGS

These and other features of the invention will be better understood from the following description with reference to the accompanying drawings in which.

DETAILED DESCRIPTION

Figure 1:
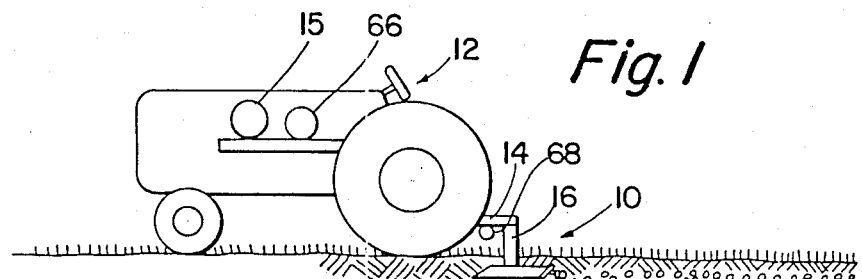
FIG. 1 is a side elevational view, partly in section, of a tractor and a subsurface chemical applicator according to the invention.

In FIG. 1, there is shown a subsurface applicator 10, a tractor 12, a tongue 14, a chemical tank 15 and a vertically oriented standard 16 connected together to apply a fluid such as a herbicide, insecticide, fungicide or fertilizer to the roots of plants.

The subsurface applicator 10 is mechanically connected to the tractor 12 by the tongue 14 and the vertically oriented standard 16 to be pulled by the tongue 14 through the soil at a preselected depth. The vertically oriented standard 16: (1) extends through the surface for connection to the tongue 14 above the surface and to the applicator below the surface; and (2) is a plate having its narrow edge facing forward and being sufficiently thin to reduce excessive breaking or disturbance of the surface to less than five percent of the surface area. The sursurface applicator 10 applies the chemical upwardly to the soil from the chemical tank 15 as it moves.

Figure 2:
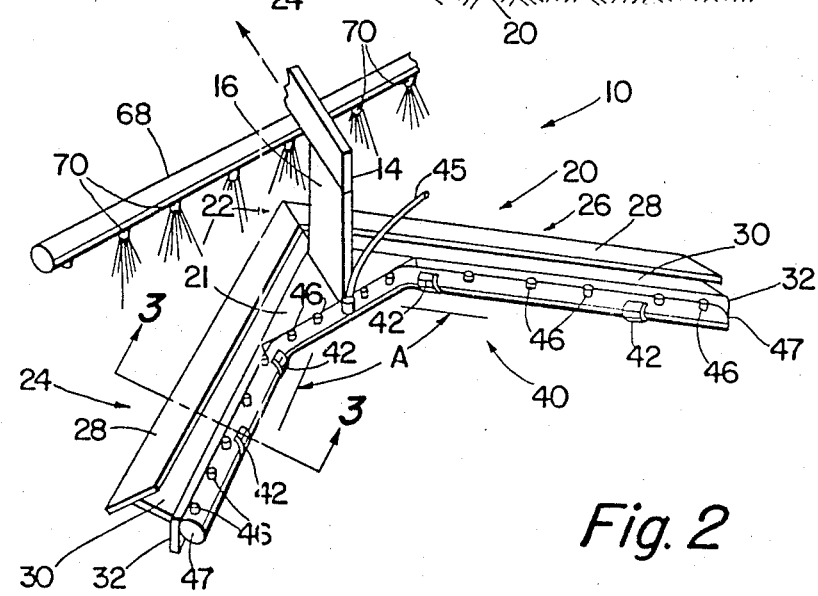
FIG. 2 is an enlarged, perspective view of a subsurface chemical applicator according to the invention.

In FIG. 2, there is shown the subsurface applicator 10 connected to the vertically oriented standard 16 and having a sweep 20, a gusset 21 and a manifold 40. The sweep 20 is rigidly fastened to the vertically oriented standard 16 by the gusset 21 which positions the sweep 20 at a selected depth in the soil. The sweep 20 supports and carries the manifold 40 which distributes the chemical. To support the sweep 20 and mount the vertically oriented standard 16 to it, the gusset 21 is a triangular plate welded to the sweep 20 and at its top surface to the bottom end of the vertically oriented standard 16.

To carry the manifold 40, the sweep 20 includes a pointed, relatively large apex 22 and identical trailing sweep wings 24 and 26 which extend outwardly from the pointed apex 22 at an angle indicated by the letter "A" in FIG. 2. The gusset 21 has an apex angle equal to the angle "A" and has each of its two side edges welded to a corresponding one of the trailing sweep wings 24 and 26 of the sweep 20 with the edge of the vertically oriented standard 16 being welded to its top surface bisecting the angle "A". Angle "A" for most purposes is within the range of 60 to 90 degrees, with approximately 80 degrees being preferred.

The trailing sweep wings 24 and 26 each include a downwardly inclined, plate-like element 28 having a generally horizontally oriented supporting plate 30 attached. The distance between the two trailing ends of the sweep is adjusted for coverage by a single sweep. To reduce the disturbance of soil surface, the width of the vertically oriented standard 16 is less than five percent of the distance between ends of the sweep.

The manifold 40 is an elongated steel pipe having a diameter of 1.27 centimeters. It is secured to the horizontally oriented supporting plate 30 by means of a plurality of brackets 42 and bolts 44 (not shown in FIG. 2) at a location slightly behind and slightly below the rear upper surface of the blade 28. It is formed in three sections, one being parallel to and supported against the trailing sweep wing 24, a second being parallel to and supported against the base edge of the gusset 21 and the third being parallel to and supported against the edge of the trailing sweep wing 26. An inlet line 45 connects with the chemical tank 15 and the manifold 40 to provide chemicals under pressure to the manifold 40 from the chemical tank 15 (FIG. 1).

To spray the chemical upwardly, the manifold 40 includes a plurality of parallel nozzles 46 spaced apart from each other along the length of the manifold 40 and each having an orifice diameter of 0.25 to 1.00 millimeter and are spaced in the range of 2 to 10 centimeters apart. End caps 47 close the ends of the manifold 40 to be pressurized. The parallel nozzles 46 are arranged relative to the sweep 20 such that, when the subsurface applicator 10 is in operation, the parallel nozzles 46 discharge chemicals substantially vertically upwardly. Because the manifold 40 is somewhat to the rear of the horizontally oriented supporting plate 30, the upward flow of chemicals is not impeded by the sweep 20.

The distance between nozzles should be less than 30 centimeters and more than one centimeter and their orifice diameters should be between 0.25 and 1.00 millimeter. The total height of the sweep or other forward soil moving implement should be less than eight centimeters and the nozzles should be no further than two centimeters from the adjacent edge of the soil moving implement.

Figure 3:
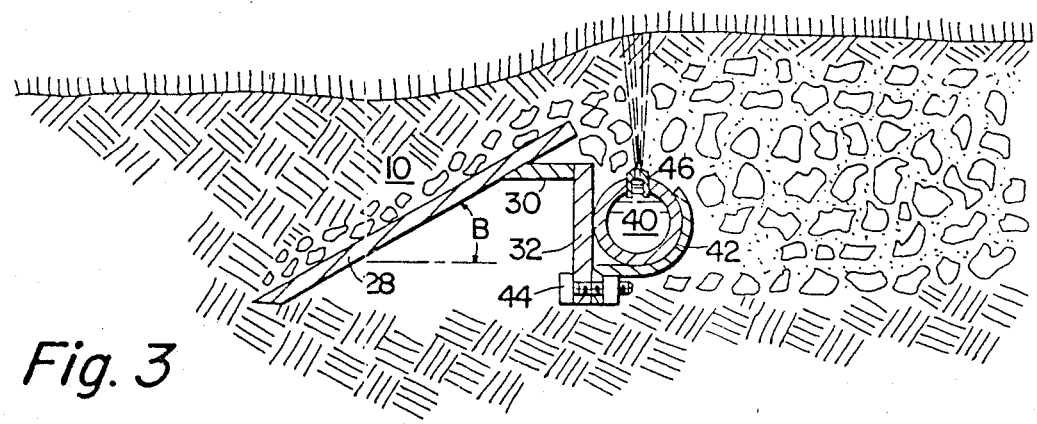
FIG. 3 is a cross-sectional view of a subsurface chemical applicator according to the invention taken along a plane indicated by line 3—3 in FIG. 2.

In FIG. 3, there is shown a cross-section of the subsurface applicator 10 taken through lines 3—3 of FIG. 2 as it is oriented in opreation. As best shown in FIG. 3, the manifold 40 is mounted to the sweep 20 by the brackets 42 which circumscribe the manifold 40 and are fastened to the sweep 20 by bolts 44. The parallel nozzles 46 have their upper edge slightly lower than and to the rear of the highest edge of the sweep 20.

When the sweep 20 is in operation, the angle of the plate-like element 28 is relative to the horizontal as indicated in FIG. 3 by the letter "B". Angle "B" is on the order of 10 to 40 degrees with approximately 20 degrees being preferred. The maximum width of the sweep 20 between trailing ends is about 200 centimeters. As indicated previously, a plurality of sweeps 20 can be employed at a given time so as to cover the entire ground width of the maching in a single pass.

Figure 4:
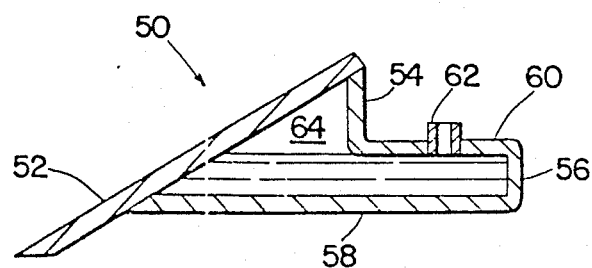
FIG. 4 is a cross sectional view of an alternative embodiment of a subsurface chemical applicator according to the invention.

In FIG. 4, there is shown an alternative embodiment of applicator 50 which differs from the subsurface applicator 10, in that the manifold 40 and the sweep 20 are combined in a single, integral unit in the applicator 50 rather than being separate units as in the subsurface applicator 10.

The applicator 50 includes a downwardly inclined, plate-like element 52, a generally vertically oriented supporting plate 54, a generally vertically oriented backup plate 56 and a generally horizontally oriented bottom plate 58. The intersection between the vertically oriented supporting plate 54 and the vertically oriented backup plate 56 includes a transition region 60 within which a plurality of nozzles 62 are inserted. The elements 52, 54, 56, 58 and 60 are secured together so as to define a fluid-tight chamber 64.

End caps (not shown) permit the fluid-tight chamber 64 to be pressurized with chemicals such as herbicides, fertilizer and the like. As with the subsurface applicator 10, the nozzles 62 each have an oriface diameter of 0.25 to 1.00 millimeter and are preferably spaced within the range of 2 to 10 centimeters apart. Accordingly, the functional characteristics of the applicator 50 are substantially identical to that of the subsurface applicator 10.

The applicators 10 and 50 are drawn through the ground at a depth of up to eight centimeters from the top of the application and chemicals are injected nearly to the surface of the soil with uniformity. To achieve proper soil penetration, solid-stream jets are used. Penetration depth is directly proportional to the length of the solid-stream jet and also directly proportional to the square root of the operating pressure. Penetration depth also is a function of soil moisture content and soil bulk density.

The angle "A" (FIG. 2), the location and spacing between parallel nozzles 46 (FIGS. 2 and 3) or nozzles 62 (FIG. 4), the angle "B", the size of the plate-like element 28 (FIG. 2) and 52 (FIG. 4) and the speed of motion of the applicator with respect to the surface of the ground are each related to the uniformity of depth and penetration distance of the chemical.

The distance between the parallel paths followed by any two adjacent nozzle openings is sufficiently short to place herbicide bands close enough together to effectively control weeds. The distance between the bands must be short enough so that seedlings located between the bands contact the bands during early growth. The bands in the preferred embodiment are 15 millimeters apart but may be as far as 350 millimeters apart under some circumstances.

The angle "B" (FIG. 3), the size of the plate-like element 28 (FIG. 4) and the speed of movement of the applicator with respect to the surface in the direction it is being pulled is sufficiently great to force soil upwardly to the top of the upper edge of the plate-like element 28 (FIG. 3) or 52 (FIG. 4).

The fluid pressure must be sufficient so that for a given porosity of soil and moisture content, enough fluid penetrates the soil from one nozzle to provide a volume of soil wet with the chemical to extend between one centimeter and eight centimeters when the applicator is moved with a forward velocity of at least four miles per hour. The fluid should be uniformly mixed in the soil.

The proper rate of flow, pressure and speed may be determined experimentally for each field by incorporating a fluorescent tracer in the liquid and making trial runs at different pressures, nozzle spacing and speed of movement. Each trial run is over a different trial run area of soil. Samples are taken from a plurality of locations in each trail run area and compared. The uniformity of incorporation can then be determined by the uniformity of fluorescent tracer.

In one embodiment, a second tank 66 (FIG. 1) and a manifold 68 (FIGS. 1 and 2) are mounted to the tractor 12 with the manifold being positioned above the surface of the ground with nozzles 70 directed downwardly to spray herbicide on the soil surface.

The nozzles 70 are spaced 6 to 24 inches above the soil and one to two feet apart in a direction transverse to the direction of movement of the tractor to provide complete uniform coverage of herbicide over the soil surface. This arrangement when used with subsurface application provides under some circumstances results superior to the subsurface application only. The herbicide applied to the surface will have a different concentration or be a different herbicide from that applied subsurface.

To evaluate weed control using the subsurface applicator 10 while maintaining crop residue on the soil surface, herbicides sold under the trademark TREFLAN (Triflureim) and SENCOR (Metribuzin) were injected through the parallel nozzles 46. Spraying was carried out with nozzle spacing of two centimeters and four centimeters. The sweep 20 was maintained at a depth of two centimeters and eight centimeters.

To check penetration distance, fluorescent tracer was applied through the manifold 40 at injection pressures of 138 k Pa. (Kilopascals) and 345 k Pa. Injection pressure and penetration distance have been summarized in the following table:

| Injection Pressure (k Pa) | Penetration Distance (cm) |
|---|---|
| 138 | 1.1–1.9 |
| 345 | 2.6–3.3 |
| 541 | 2.7–4.2 |

Penetration distance is (1) a function of soil moisture content; (2) directly proportional to length of the jet (or jet velocity) issuing from the parallel nozzles 46 at a fixed ground speed; and (3) directly proportional to the square root of the injection pressure.

Weed control and soybean yield are significantly improved by injecting herbicide in a layer under crop residue. The sweep 20 can be operated as deep as eight centimeters below the surface of the soil and it still controls weeds as well as double-tandem disc incorporation. Using an optimum nozzle spacing of between two to four centimeters, and depending on such factors as operating pressure, soil moisture content and soil bulk density, effective chemical application can be accomplished completely to the surface of the soil in a single pass without substantially disturbing existing crop residue on the surface of the soil.

As can be understood from the above description, the applicator and technique have the advantages of: (1) enabling herbicides to be applied in a single pass to a wide area; (2) limiting area which can be covered in a single pass only by the size of the sweep and the number of sweeps employed at a given time; (3) permitting a subsurface applicator employing a manifold which can be attached to an existing sweep, thus enabling presently existing equipment to be used for the subsurface injection of herbicides and other chemicals; (4) permitting uniform distribution of the chemical; (5) not excessively disturbing the surface of the soil; and (6) retaining crop residue on the soil surface.

Although a preferred embodiment of the invention has been described in some particularity, it will be appreciated that various modifications and changes in the preferred embodiment may be made without deviating from the invention. Accordingly, it is to be understood that, within the scope of the appended claims, the invention may be practiced otherwise than as specifically described.

What is claimed is:

1. A method comprising the steps of:

forcing a horizontally elongated implement having two trailing wings joined at a forward end with the trailing wings being at an angle to each other of between 60 degrees or greater and being spread no less than 51 centimeters from each other at their trailing ends horizontally through the soil in a first direction at a depth sufficient to break up the subsurface without inverting the surface and no deeper than eight centimeters;

injecting chemicals in a jet under pressure substantially vertically upwardly from a location adjacent to the rear of the subsurface implement at a number of locations spaced from each other horizontally between two and four centimeters in a second direction at an angle to the first direction;

the step of injecting includes the step of injecting through nozzles having narrow openings spaced approximately 2 to 4 centimeters from each other;

said step of forcing including the step of forcing a standard for the implement including a plate connected at its bottom end to the implement and adapted to be connected at its top end to a vehicle, the plate having a dimension transverse to the implement that is no more than 5 percent the distance apart of the trailing ends of the implement;

said step of forcing further including the step of moving the jets through a sufficient amount of soil at a pressure of application and speed of movement of the jet to form a treated layer of soil containing more than four gallons of chemicals for each acre in which the chemicals are incorporated and one gallon of said chemicals incorporated in soil for at least 67 cubic yards of soil; and the step of injecting including the step of injecting under a pressure sufficient so that for a given porosity of soil and moisture content, enough fluid penetrates the soil from one nozzle to provide a volume of soil wet with the chemical to extend at least two inches high and 0.5 inches wide with a forward velocity of the implement of at least four miles per hour.

2. A method comprising the steps of:

forcing a horizontally elongated implement horizontally through the soil in a first direction at a depth sufficient to break up the subsurface soil without inverting the surface soil;

injecting chemicals vertically upwardly under a pressure of approximately 100 to 700 grams per square centimeter from a plurality of nozzles, each of which has a different opening with a diameter in the range of 0.25 to 1.00 millimeter, each of which is spaced apart from another a distance of between 1 and 30 centimeters in a second direction at an angle to the first direction and each of which is located adjacent to the rear of the subsurface implement whereby the chemicals reach substantially the surface at a number of locations spaced from each other horizontally to form a plurality of substantially parallel bands of treated soil;

the step of forcing including the step of forcing the implement through the soil with the nozzles at a depth of less than 8 centimeters from the surface of the soil but more than two centimeters; and the step of injecting including the step of injecting chemicals at locations spaced from each other in the second direction, a sufficient distance and at a sufficient pressure to form bands having a width of between one millimeter and 10 millimeters spaced from each other a distance less than 30 millimeters.

3. The method of claim 2 further including the steps of:

determining the pressure of injection, depth and speed needed for uniform distribution by making a plurality of trial runs across different areas with a liquid containing a fluorescent tracer;

selecting the pressure, depth and speed based on the uniformity of the fluorescent tracer; and injecting chemicals across the field using the selected pressure.

4. The method of claim 2 further including the step of injecting chemicals downwardly downwardly onto the surface of the soil.

* * * * *